US012596588B2

(12) United States Patent
Xing et al.

(10) Patent No.: US 12,596,588 B2
(45) Date of Patent: Apr. 7, 2026

(54) EDGE COMPUTING METHOD AND SYSTEM, EDGE DEVICE AND CONTROL SERVER PROVIDING MORE COMPUTING RESOURCES FOR EDGE COMPUTING APPLICATIONS

(71) Applicant: Siemens Aktiengesellschaft, Munich (DE)

(72) Inventors: Yu Xuan Xing, Langfang (CN); Tong Xin Bai, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 474 days.

(21) Appl. No.: 18/246,157

(22) PCT Filed: Sep. 23, 2020

(86) PCT No.: PCT/CN2020/117153
§ 371 (c)(1),
(2) Date: Mar. 21, 2023

(87) PCT Pub. No.: WO2022/061587
PCT Pub. Date: Mar. 31, 2022

(65) Prior Publication Data
US 2023/0367648 A1 Nov. 16, 2023

(51) Int. Cl.
*G06F 9/50* (2006.01)
(52) U.S. Cl.
CPC ................................. *G06F 9/5072* (2013.01)
(58) Field of Classification Search
CPC ...................................................... G06F 9/5072
(Continued)

(56) References Cited

U.S. PATENT DOCUMENTS 9,021,126 B2 * 4/2015 Ishikawa ............... G06F 9/4494
370/473
2014/0317449 A1 * 10/2014 Kohno .................. G06F 9/5027
718/104
(Continued)

FOREIGN PATENT DOCUMENTS

CN 108141407 A 6/2018 ............. H04L 12/66
CN 110191007 A 8/2019 ............. H04L 12/24
(Continued)

OTHER PUBLICATIONS

Chinese Office Action, Application No. 202080103718.7, 17 pages, Jul. 26, 2024.
(Continued)

*Primary Examiner* — Charlie Sun
(74) *Attorney, Agent, or Firm* — Slayden Grubert Beard PLLC

(57) ABSTRACT

Various embodiments of the teachings herein include an edge computing method. The method may include: installing a daemon on a first edge device connected to a control server, wherein the daemon sends information to the server when an accelerator is connected to the edge device indicating the first edge device is connected to an accelerator; receiving the connection information from the daemon and configuring an accelerator enabled flag for the first edge device indicating the first edge device is connected to an accelerator; receiving a sharing request from either edge device, wherein the sharing request requesting an accelerator execute a target application; labeling an edge device with the accelerator enabled flag as a second edge device according to the sharing request; and loading the target application onto the second edge device so the accelerator connected to the second edge device executes the target application.

19 Claims, 16 Drawing Sheets

(58) Field of Classification Search

USPC .......................................................... 718/104

See application file for complete search history.

(56) References Cited

U.S. PATENT DOCUMENTS

| | | | |
|---|---|---|---|
| 2016/0065419 A1* | 3/2016 | Szilagyi .............. | G06F 11/3006 |
| | | | 709/224 |
| 2018/0246768 A1 | 8/2018 | Palermo et al. | |
| 2019/0044886 A1 | 2/2019 | Bernat et al. | |
| 2019/0222518 A1 | 7/2019 | Bernat .................. | H04L 12/803 |
| 2019/0227843 A1 | 7/2019 | Custodio ................... | G06F 9/50 |
| 2020/0142735 A1 | 5/2020 | Maciocco et al. | |
| 2021/0073047 A1 | 3/2021 | Bhandaru et al. | |

FOREIGN PATENT DOCUMENTS

| | | | | |
|---|---|---|---|---|
| CN | 110 990 133 | 4/2020 | ............... | G06F 9/48 |
| CN | 111061491 A | 4/2020 | ............... | G06F 8/61 |
| CN | 111 182 083 | 5/2020 | ............. | H04L 29/08 |
| CN | 111108474 A | 5/2020 | ............. | G06F 9/445 |
| CN | 111 327 651 | 6/2020 | ............. | H04L 29/08 |

OTHER PUBLICATIONS

Chinese Office Action, Application No. 202080103718.7, 17 pages, Apr. 23, 2025.

Extended European Search Report, Application No. 20954441.0, 10 pages, May 10, 2024.

Search Report for International Application No. PCT/CN2020117153, 14 pages, Jun. 21, 2021.

\* cited by examiner

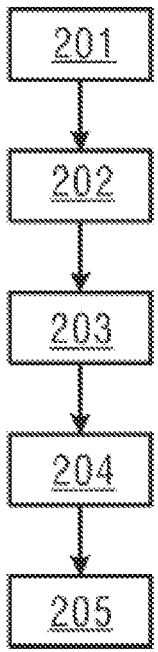
Fig. 2
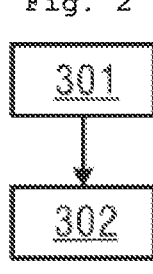
Fig. 3
Fig. 4

EDGE COMPUTING METHOD AND SYSTEM, EDGE DEVICE AND CONTROL SERVER PROVIDING MORE COMPUTING RESOURCES FOR EDGE COMPUTING APPLICATIONS

CROSS-REFERENCE TO RELATED APPLICATIONS

This application is a U.S. National Stage Application of International Application No. PCT/CN2020/117153 filed Sep. 23, 2020, which designates the United States of America, the contents of which are hereby incorporated by reference in their entirety.

TECHNICAL FIELD

The present disclosure relates to edge computing. Various embodiments of the teachings herein include edge computing methods, edge computing systems, edge devices, control servers and/or computer-readable medium.

BACKGROUND

Edge computing is done on a side near a data source, and an edge computing application is launched on the edge side. With the rapid development of edge computing, edge computing is applied to various fields and higher and higher requirements for edge computing are put forward. Edge computing is usually realized by edge devices. Current edge devices have very limited computing resources, for example, a small memory size of an edge device and a low computing capability of the processor of an edge device. As a result, computing resources of edge devices often fail to meet the requirements of edge computing applications. How to provide more computing resources for edge computing applications is a technical problem that needs to be solved urgently.

SUMMARY

In view of this, the edge computing methods and system, edge devices, control servers and a computer-readable medium provided by the present invention can provide more computing resources for edge computing applications. For example, some embodiments include an edge computing method which comprises: a control server installing a daemon on at least one edge device of at least two edge devices connected to the control server, wherein the daemon is used to send connection information to the control server when monitoring that an accelerator is connected to the edge device on which the daemon is installed, and the connection information is used to indicate that the edge device on which the daemon sending the connection information is installed is connected to an accelerator; the control server receiving the connection information from any daemon and configuring an accelerator enabled flag for the edge device on which the daemon is installed according to the connection information, wherein the accelerator enabled flag is used to indicate that the edge device marked with the accelerator enabled flag is connected to an accelerator; the control server receiving a sharing request from any first edge device, wherein the sharing request is used to request an accelerator to execute a target application and the first edge device is one edge device of the at least two edge devices; the control server selecting an edge device configured with the accelerator enabled flag as a second edge device according to the sharing request; and the control server loading the target application onto the second edge device so that the accelerator connected to the second edge device executes the target application.

As another example, some embodiments include an edge computing method, the method is applied to an edge device, a daemon is installed on the edge device, the daemon is used to send connection information to a control server when monitoring that an accelerator is connected to the edge device on which the daemon is installed, and the method comprises: by means of the daemon, the edge device monitoring whether an accelerator is connected to the edge device; the edge device sending connection information to the control server by means of the daemon when monitoring that an accelerator is connected to the edge device, wherein the connection information is used to indicate that the edge device on which the daemon sending the connection information is installed is connected to an accelerator; and the edge device controlling an accelerator connected to the edge device to execute a target application when the target application has been loaded onto the edge device under the control of the control server, wherein the target application is an application which a target edge device requests an accelerator to execute, and the target edge device is any other edge device connected to the control server.

As another example, some embodiments include an edge computing method applied to an edge device, and the method comprises: the edge device generating a sharing request, wherein the sharing request is used to request an accelerator to execute a target application; and the edge device sending the sharing request to a control server so that the control server selects an accelerating edge device to which an accelerator is connected and loads the target application onto the accelerating edge device.

As another example, some embodiments include a control server, which comprises: a first installation module, used to install a daemon on at least one edge device of at least two edge devices connected to the control server, wherein the daemon is used to send connection information to the control server when monitoring that an accelerator is connected to the edge device on which the daemon is installed, and the connection information is used to indicate that the edge device on which the daemon sending the connection information is installed is connected to an accelerator; a first receiving module, used to receive the connection information from any daemon installed by the first installation module and configure an accelerator enabled flag for the edge device on which the daemon is installed according to the connection information, wherein the accelerator enabled flag is used to indicate that the edge device marked with the accelerator enabled flag is connected to an accelerator; a second receiving module, used to receive a sharing request from any first edge device, wherein the sharing request is used to request an accelerator to execute a target application and the first edge device is one edge device of the at least two edge devices; a selection module, used to select an edge device configured with the accelerator enabled flag as a second edge device according to the sharing request received by the second receiving module; and a second installation module, used to load the target application onto the second edge device selected by the selection module so that the accelerator connected to the second edge device executes the target application.

As another example, some embodiments include a control server, which comprises at least one first memory and at least one first processor; the at least one first memory is used to store a machine-readable program; and the at least one first processor is configured to invoke the machine-readable program to execute one or more of the methods described herein.

As another example, some embodiments include an edge device, a daemon is installed on the edge device, the daemon is used to send connection information to a control server when monitoring that an accelerator is connected to the edge device on which the daemon is installed, and the edge device comprises: a first monitoring module, used to monitor whether an accelerator is connected to the edge device by means of the daemon and send connection information to the control server by means of the daemon when monitoring that an accelerator is connected to the edge device, wherein the connection information is used to indicate that the edge device on which the daemon sending the connection information is installed is connected to an accelerator; and an accelerator control module, used to control an accelerator connected to the edge device to execute a target application when the target application has been loaded onto the edge device under the control of the control server, wherein the target application is an application which a target edge device requests an accelerator to execute, and the target edge device is any other edge device connected to the control server.

As another example, some embodiments include an edge device, which comprises: a request generation module, used to generate a sharing request, wherein the sharing request is used to request an accelerator to execute a target application; and a request sending module, used to send the sharing request from the request generation module to a control server so that the control server selects an accelerating edge device to which an accelerator is connected and loads the target application onto the accelerating edge device.

As another example, some embodiments include an edge device, which comprises at least one second memory and at least one second processor; the at least one second memory is used to store a machine-readable program; and the at least one second processor is used to invoke the machine-readable program to execute one or more of the methods described herein.

As another example, some embodiments include an edge computing system, which comprises: at least two edge devices and either control server as described herein; the control server is connected to the at least two edge devices.

As another example, some embodiments include a computer-readable medium, computer instructions are stored in the computer-readable medium and a processor executes one or more of the methods as described herein when the computer instructions are executed by the processor.

BRIEF DESCRIPTION OF THE DRAWINGS

FIG. 2 is a flowchart of an example edge computing method incorporating teachings of the present disclosure;

FIG. 3 is a flowchart of an example method of monitoring whether an accelerator connected to an edge device is removed incorporating teachings of the present disclosure;

FIG. 4 is a flowchart of an example method of acquiring the driver of an accelerator incorporating teachings of the present disclosure;

Figure 1:
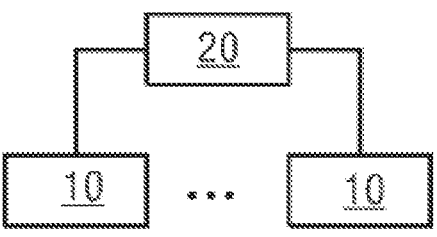
FIG. 1 is a schematic diagram of an example edge computing system incorporating teachings of the present disclosure.

DESCRIPTION OF REFERENCE NUMERALS
IN THE DRAWINGS

| 10: Edge device | 20: Control server | |
| 201-205, 301-302, 401-403, 501-503, 601-602, 701-702, 801-810: Steps of methods | | |
| 901: First installation module | 902: First receiving module | 903: Second receiving module |
| 904: Selection module | 905: Second installation module | 1001: Third receiving module |

-continued

| 1002: Deletion module | 1101: Forwarding module | 1201: Control module |
|---|---|---|
| 1301: Fourth receiving module | 1302: First acquisition module | 1303: First sending module |
| 1401: Fifth receiving module | 1501: Second acquisition module | 1601: First monitoring module |
| 1602: Accelerator control module | 1701: Second monitoring module | 1801: First data receiving module |
| 1901: Second data receiving module | 2001: Driving request module | 2002: Driving receiving module |
| 2101: Request generation module | 2102: Request sending module | 2201: First data sending module |
| 2301: Second data sending module | 2401: Program sending module | 2501: First memory |
| 2502: First processor | 2601: Second memory | 2602: Second processor |

DETAILED DESCRIPTION

From the technical solutions provided in the first aspect to the tenth aspect, it can be seen that a control server installs a daemon on at least one edge device connected to the control server, the daemon sends connection information to the control server when monitoring that an accelerator is connected to the edge device on which the daemon is installed, the control server receives connection information from any daemon and configures an accelerator enabled flag for the edge device on which the daemon is installed according to the connection information, any first edge device can send a sharing request to the control server to request an accelerator to execute a target application, the control server selects one from the edge devices configured with an accelerator enabled flag as a second edge device and loads the target application onto the second edge device, and the second edge device utilizes the accelerator connected to the second edge device to execute the target application. Thus, it can be seen that when the first edge device requests to share an accelerator, the control server can select the second edge device to which an accelerator is connected and utilize the accelerator on the second edge device to execute the target application. The accelerator on the second edge device is shared with the first edge device to execute the target application. Through the accelerator, more computing resources are provided for the target edge computing application. In addition, an accelerator connected to any edge device can be shared between different edge devices.

In some embodiments, in combination with any of the above-mentioned aspects, the control server can further maintain the connection of an accelerator on each edge device in the following way: the control server receives disconnection information from a daemon, wherein the daemon is further used to send the disconnection information to the control server when monitoring that an accelerator connected to the edge device on which the daemon is installed is removed, and the disconnection information is used to indicate that an accelerator connected to the edge device on which the daemon sending the disconnection information is installed is removed; and the control server deletes the accelerator enabled flag of the edge device on which the daemon sending the disconnection information is installed according to the disconnection information.

In some embodiments, the daemon on each edge device sends disconnection information to the control server when monitoring that the accelerator on the edge device has been removed, and the control server deletes the accelerator enabled flag of the edge device sending the disconnection information. The deletion of the accelerator enabled flag indicates that no accelerator is connected to the edge device, and the control server will not select an edge device to which no accelerator is connected as a second edge device, thus guaranteeing that the first edge device can share the accelerator of the selected second edge device.

In some embodiments, in combination with any of the above-mentioned aspects, when installing a daemon on at least one edge device of at least two edge devices connected to the control server, specifically, the control server can install the daemon in the following way the control server installs a first container on at least one edge device of at least two edge devices connected to the control server, wherein the first container contains the daemon and the first container is used to run the daemon.

In some embodiments, a daemon is packaged in a first container and the running environment required for running the daemon is packaged in the first container, without any necessity of configuring the running environment required for the daemon according to different edge devices. Thus, it is more convenient to load the daemon onto different edge devices.

In some embodiments, in combination with any of the above-mentioned aspects, when loading a target application onto a second edge device, specifically, the control server can install the target application in the following way: the control server installs a second container on the second edge device, wherein the second container contains the target application and the second container is used to run the target application.

In some embodiments, a target application is packaged in a second container and the running environment required for running the target application is packaged in the second container, without any necessity of configuring the running environment required for the target application according to different edge devices. Thus, it is more convenient to load the target application onto the second edge device.

In some embodiments, in combination with any of the above-mentioned aspects and the first possible implementation mode, the second possible implementation mode or the third possible implementation mode, data from a first edge device can be transmitted to a second edge device in either of the following two ways: a first data transmission mode: the control server forwards data from the first edge device to the second edge device so that the accelerator connected to the second edge device executes the target application to process data coming from the first edge device; and a second data transmission mode: the control server controls the first edge device sending data to the second edge device so that the accelerator connected to the second edge device executes the target application to process data coming from the first edge device.

In some embodiments, a target application can be used to process data, and the data may be data coming from a first edge device. In the first data transmission mode, the first edge device can send data to be processed to the control server, and the control server forwards the data to the second edge device. In the first data transmission mode, the first edge device does not need to establish a connection with the second edge device, and the first edge device and the second edge device only need to establish a connection with the control server. Obviously, the first data transmission mode is more convenient for different edge devices to process data, no connections are required to be established between different edge devices, the load of different edge devices is reduced, and it is simpler to deploy edge devices.

In the second data transmission mode, the first edge device can directly send data to be processed to the second edge device, the load of the control server is reduced because the control server is not required to forward data, and in addition, data transmission to the second edge device is sped up.

In some embodiments, in combination with any of the above-mentioned aspects and the first possible implementation mode, the second possible implementation mode or the third possible implementation mode, after an accelerator is connected to an edge device, it is necessary to install the required driver for the accelerator, and the driver can be obtained in the following way: the control server receives a driving request from any daemon, wherein the driving request is sent by a daemon when the daemon monitors that an accelerator is connected to the edge device on which the daemon is installed, and the driving request is used to request the driver of the accelerator connected to the edge device on which the daemon sending the driving request is installed; the control server acquires the driver requested by the driving request; and the control server sends the acquired driver to the edge device sending the driving request so that the edge device installs the driver.

In some embodiments, when an edge device needs to acquire the driver of the accelerator, the edge device sends a driving request to the control server, the control server acquires the driver requested by the driving request and sends the driver back to the edge device, and the edge device installs the driver so that the accelerator can run normally. In embodiments of the present invention, an edge device only needs to send a driving request, without any necessity of searching for the required driver on a network or other devices. Thus, the consumption of computing resources of the edge device is reduced so that the edge device has more computing resources to process other tasks.

In some embodiments, in combination with any of the above-mentioned aspects and the first possible implementation mode, the second possible implementation mode or the third possible implementation mode, a target application can be acquired in either of the following ways: a first application acquisition mode: before the control server loads the target application onto the second edge device, it further comprises: the control server receiving the target application from the first edge device to load the received target application onto the second edge device; and a second application acquisition mode: the control server acquires the target application from at least one pre-stored application according to the sharing request to load the acquired target application onto the second edge device.

In the first application acquisition mode, the first edge device sends the target application to the control server, and then the control server loads the target application onto the second edge device. In this mode, the first edge device saves the target application, the first edge device sends the target application to the control server when it is necessary to utilize the accelerator to execute the target application, and the control server loads the target application to the second edge device. In this way, the control server does not need to store a plurality of applications or search for the required target application, but only needs to receive the target application sent by the first edge device, and thus the computing resources of the control server are saved.

In the second application acquisition mode, at least one application is pre-stored in the control server, the target application is one of at least one application, and the control server needs to search the at least one application for the target application and load the target application onto the second edge device. The control server manages the applications in a centralized way, and edge devices do not need to save the target application to be executed. Thus, computing resources of edge devices are saved.

As mentioned above, current edge devices have very limited computing resources, more and more applications require a large memory size, a large hard disk size, and a high processing speed, the memory size and the hard disk size of edge devices are small, and the processing speed of the processor of edge devices is low. As a result, computing resources of edge devices often fail to meet the requirements of edge computing applications.

In some embodiments, computing resources of edge devices are increased by connecting an accelerator to edge devices. Thus, applications can be executed by the accelerator and more computing resources are provided for applications. Specifically, in some embodiments, a daemon is installed on at least one edge device, the daemon sends connection information to the control server when monitoring that an accelerator is connected to the edge device on which the daemon is installed, the control server manages accelerators in a unified way, the control server selects an edge device to which an accelerator is connected as a second edge device and loads the target application requested by the sharing request to be executed onto the second edge device when receiving a sharing request from any first edge device, and the accelerator connected to the second edge device runs the target application to meet the requirements of the target application for computing resources. In addition, the accelerator can be used by the edge device to which the accelerator is connected, or can be used by an edge device to which the accelerator is not connected, and the sharing of the accelerator is realized between different edge devices.

The edge computing methods and system, edge devices and control servers are described in detail below in combination with the drawings. As shown in FIG. 1, an example edge computing system comprises: at least two edge devices 10 and any control server 20 described in this document; the control server 20 is connected to the at least two edge devices 10; a daemon is installed on at least one edge device 10 of the at least two edge devices 10; the control server 20 installs a daemon on at least one edge device 10 of at least two edge devices 10 connected to the control server, wherein the daemon is used to send connection information to the control server when monitoring that an accelerator is connected to the edge device 10 on which the daemon is installed, and the connection information is used to indicate that the edge device on which the daemon sending the connection information is installed is connected to an accelerator; each edge device 10 on which a daemon is installed monitors, by means of the daemon, whether an accelerator is connected to the edge device 10, and the edge device sends connection information to the control server 20 by means of the daemon when monitoring that an accelerator is connected to the edge device 10, wherein the connection information is used to indicate that the edge device 10 on which the daemon sending the connection information is installed is connected to an accelerator; the control server 20 receives the connection information from any daemon and configures an accelerator enabled flag for the edge device 10 on which the daemon is installed according to the connection information, wherein the accelerator enabled flag is used to indicate that the edge device 10 marked with the accelerator enabled flag is connected to an accelerator; a first edge device 10 generates a sharing request and sends the sharing request to the control server 20, wherein the sharing request is used to request an accelerator to execute a target application and the first edge device is one edge device sending the sharing request to the control server of the at least two edge devices 10; the control server 20 receives a sharing request from any first edge device 10 and selects an edge device configured with the accelerator enabled flag as a second edge device 10 according to the sharing request; the control server 20 loads the target application onto the second edge device 10 so that an accelerator connected to the second edge device 10 executes the target application; and the second edge device 10 controls an accelerator connected to the second edge device to execute the target application.

In some embodiments, a control server installs a daemon on at least one edge device connected to the control server, the daemon sends connection information to the control server when monitoring that an accelerator is connected to the edge device on which the daemon is installed, the control server receives connection information from any daemon and configures an accelerator enabled flag for the edge device on which the daemon is installed according to the connection information, any first edge device can send a sharing request to the control server to request an accelerator to execute a target application, the control server selects one from the edge devices configured with an accelerator enabled flag as a second edge device and loads the target application onto the second edge device, and the second edge device utilizes the accelerator connected to the second edge device to execute the target application. Thus, it can be seen that when the first edge device requests to share an accelerator, the control server can select the second edge device to which an accelerator is connected and utilize the accelerator on the second edge device to execute the target application. The accelerator on the second edge device is shared with the first edge device to execute the target application. Through the accelerator, more computing resources are provided for the target edge computing application. In addition, an accelerator connected to any edge device can be shared between different edge devices.

The control server and edge devices in the edge computing system, and the edge computing method applied to the control server and the edge computing method applied to edge devices are described in detail below in combination with the drawings.

As shown in FIG. 2, an edge computing method is applied to the control server, may comprise the following steps: step 201: a control server installs a daemon on at least one edge device of at least two edge devices connected to the control server, wherein the daemon is used to send connection information to the control server when monitoring that an accelerator is connected to the edge device on which the daemon is installed, and the connection information is used to indicate that the edge device on which the daemon sending the connection information is installed is connected to an accelerator; step 202: the control server receives the connection information from any daemon and configures an accelerator enabled flag for the edge device on which the daemon is installed according to the connection information, wherein the accelerator enabled flag is used to indicate that the edge device marked with the accelerator enabled flag is connected to an accelerator; step 203: the control server receives a sharing request from any first edge device, wherein the sharing request is used to request an accelerator to execute a target application and the first edge device is one edge device of the at least two edge devices; step 204: the control server selects an edge device configured with the accelerator enabled flag as a second edge device according to the sharing request; and step 205: the control server loads the target application onto the second edge device so that the accelerator connected to the second edge device executes the target application.

In some embodiments, a control server installs a daemon on at least one edge device connected to the control server, the daemon sends connection information to the control server when monitoring that an accelerator is connected to the edge device on which the daemon is installed, the control server receives connection information from any daemon and configures an accelerator enabled flag for the edge device on which the daemon is installed according to the connection information, any first edge device can send a sharing request to the control server to request an accelerator to execute a target application, the control server selects one from edge devices configured with an accelerator enabled flag as a second edge device and loads the target application onto the second edge device, and the second edge device utilizes the accelerator connected to the second edge device to execute the target application. Thus, it can be seen that when the first edge device requests to share an accelerator, the control server can select the second edge device to which an accelerator is connected and utilize the accelerator on the second edge device to execute the target application. The accelerator on the second edge device is shared with the first edge device to execute the target application. Through the accelerator, more computing resources are provided for the target edge computing application. In addition, an accelerator connected to any edge device can be shared between different edge devices.

In some embodiments, the control server may be implemented as a computer or a computer cluster. Edge devices include a programmable logic controller (PLC), a Raspberry Pi computer and a field programmable gate array (FPGA). After being started on an edge device, a daemon may run all the time at the background of the edge device to monitor the edge device.

In some embodiments, the control server installs a daemon on at least one edge device, an accelerator on the edge device on which the daemon is installed can be monitored by means of the daemon, access information is generated and is sent to the control server when the daemon monitors that an accelerator is connected to the edge device, the access information may include information such as ID of the edge device, and the control server can determine the edge device to which an accelerator is connected according to the ID of the edge device in the access information and configures an accelerator enabled flag for the edge device to which an accelerator is connected. The control server determines whether an accelerator is connected to an edge device according to an accelerator enabled flag. When an accelerator enabled flag is configured for an edge device, an accelerator is connected to the edge device, and when no accelerator enabled flag is configured for the edge device, no accelerator is connected to the edge device.

In some embodiments, in order to more conveniently install a daemon on an edge device, the daemon may be packaged in a container and then the whole container may be installed on the edge device. Specifically, a control server installing a daemon on at least one edge device of at least two edge devices connected to the control server comprises the control server installing a first container on at least one edge device of at least two edge devices connected to the control server, wherein the first container contains the daemon and the first container is used to run the daemon.

In some embodiments, a container in which a daemon is packaged is used as a first container and the running environment required for running the daemon is also packaged in the first container. The first container may be installed on any edge device, without any necessity of deploying the running environment required for the daemon according to different edge devices. It is very convenient to install a daemon by installing a container and the workload of configuring edge devices is greatly reduced.

In some embodiments, any edge device connected to the control server can send a sharing request to the control server, and the edge device sending the sharing request is used as a first edge device. No accelerator or an accelerator may be connected to the first edge device. When the computing resources of the first edge device cannot meet the requirements of a target application, the first edge device may send a sharing request to the control server, requesting to share an accelerator. The sharing request may contain information such as ID of the target application. The control server can determine the target application to be executed according to the sharing request.

In some embodiments, in order to more conveniently load a target application onto an edge device, the target application may be packaged in a container and then the whole container may be installed on the edge device. Specifically, the control server loading the target application onto the second edge device comprises the control server installing a second container on the second edge device, wherein the second container contains the target application and the second container is used to run the target application.

In some embodiments, a container in which a target application is packaged is used as a second container and the running environment required for running the target application is also packaged in the second container. The second container may be installed on any edge device, without any necessity of deploying the running environment required for the target application according to different edge devices. It is very convenient to load a target application by installing a container and the workload of configuring edge devices is greatly reduced. Considering that applications requested by different sharing requests to be executed are likely different, it is necessary to deploy the running environments required for different applications on each edge device and the workload will be very heavy if applications are not packaged in a container. After applications are packaged in a container, the workload of installing applications on edge devices will be reduced greatly. In addition, the target application needs to be executed by an accelerator. After the target application is packaged in a container, it is unnecessary to deploy the running environment required for the target application in the accelerator so that it is very convenient to realize plug and play of the accelerator.

In addition, the target application may be an applet or a micro service, and the control server may load the target application onto the second edge device in the following way: the control server sends information (for example, ID of the target application) of the target application to the second edge device; and the second edge device searches for the target application according to the information of the target application sent by the control server and loads the target application.

The applet is a program running dependent on a host program. After a host program is installed on an edge device, various applets can be added and used in the host program at any time. If the target application is an applet and a host program has been installed on the second edge device, the second edge device can acquire the target application according to the ID of the target application and run the target application based on the host program.

In some embodiments, the second edge device may be any edge device to which an accelerator is connected. When selecting an edge device to which an accelerator is connected as the second edge device, the control server can select an edge device randomly or according to the occupation of the accelerators. Specifically, the control server can further maintain the occupation of different accelerators, wherein a daemon monitors the occupation of the accelerator connected to an edge device on which the daemon is installed, for example, the utilization of the accelerator, and sends the occupation to the control server, and the control server records the occupation. When selecting a second edge device, the control server can select an edge device to which an idle accelerator is connected as the second edge device. Since the accelerator on the second edge device is in an idle state, the accelerator can provide more computing resources for a target application and the accelerator can execute the target application more quickly.

In some embodiments, on the basis of the edge computing method shown in FIG. 2, the control server may maintain the connection of an accelerator on each edge device according to disconnection information sent by a daemon. As shown in FIG. 3, the control server may monitor whether the accelerator connected to each edge device is removed in the following way: step 301: the control server receives disconnection information from a daemon, wherein the daemon is further used to send the disconnection information to the control server when monitoring that an accelerator connected to the edge device on which the daemon is installed is removed, and the disconnection information is used to indicate that an accelerator connected to the edge device on which the daemon sending the disconnection information is installed is removed; and step 302: the control server deletes the accelerator enabled flag of the edge device on which the daemon sending the disconnection information is installed according to the disconnection information.

In some embodiments, the daemon on edge devices to which an accelerator is connected monitors whether the accelerator connected to the edge devices is removed, and generates disconnection information when monitoring that the accelerator is removed. The disconnection information may include information such as ID of the edge device. The control server may determine the edge device from which the accelerator is removed according to the ID of the edge device in the disconnection information and delete the corresponding accelerator enabled flag of the edge device. If an edge device has no accelerator enabled flag, no accelerator is connected to the edge device.

A target application may be used to process data, which may come from a first edge device sending a sharing request. Data from a first edge device may be transmitted to a second edge device in either of the following ways:

a first data transmission mode: after the control server loads the target application onto the second edge device, it further comprises the control server forwarding data coming from the first edge device to the second edge device so that the accelerator connected to the second edge device executes the target application to process data coming from the first edge device; and a second data transmission mode: after the control server loads the target application onto the second edge device, it further comprises the control server controlling the first edge device to send data to the second edge device so that the accelerator connected to the second edge device executes the target application to process data coming from the first edge device.

In the first data transmission mode, since each edge device is connected to the control server, the first edge device may send data to the control server and then the control server may forward the data to the second edge device. In the second data transmission mode, the first edge device may directly send data to the second edge device. Specifically, the control server may send the information (for example, IP address and ID) of the second edge device to the first edge device so that the first edge device can establish a connection with the second edge device according to the received information of the second edge device, and then the first edge device may send data to the second edge device over a LAN or the Internet.

In some embodiments, data coming from the first edge device may include raw data collected by the acquisition device connected to the first edge device, and the acquisition device may be a camera or a sensor. Data coming from the first edge device may include one part of raw data and intermediate data obtained after the first edge device processes the other part of raw data. After receiving data coming from the first edge device, the second edge device may process the processed raw data and continue to process the intermediate data.

To guarantee the normal running of an accelerator, the driver required for the accelerator needs to be installed on an edge device to which an accelerator is connected. Based on the edge computing method shown in FIG. 2, an edge device may obtain the driver of an accelerator in the following way, as shown in FIG. 4: step 401: the control server receives a driving request from any daemon, wherein the driving request is sent by a daemon when the daemon monitors that an accelerator is connected to the edge device on which the daemon is installed, and the driving request is used to request the driver of the accelerator connected to the edge device on which the daemon sending the driving request is installed; step 402: the control server acquires the driver requested by the driving request; and step 403: the control server sends the acquired driver to the edge device sending the driving request so that the edge device installs the driver.

In some embodiments, after monitoring that an accelerator is connected to an edge device, the daemon on the edge device sends a driving request, the control server acquires the driver and sends the driver to the edge device, and the edge device installs the driver so that the accelerator can run normally. In addition, an edge device may directly acquire the required driver from the Internet.

In some embodiments, a target application may be acquired in either of the following two ways:

a first application acquisition mode: before the control server loads the target application onto the second edge device, it further comprises the control server receives the target application from the first edge device to load the received target application onto the second edge device; and a second application acquisition mode: before the control server loads the target application onto the second edge device, it further comprises the control server acquires the target application from at least one pre-stored application according to the sharing request to load the acquired target application onto the second edge device.

In the first application acquisition mode, the target application may be pre-stored in the first edge device, the first edge device sends the target application to the control server, and the control server loads the target application onto the second edge device. In the second application acquisition mode, the control server pre-stores applications, directly searches the pre-stored applications for the target application and then loads the target application on the second edge device.

Figure 5:
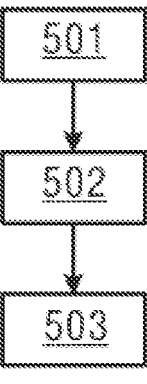
FIG. 5 is a flowchart of a further example edge computing method incorporating teachings of the present disclosure.

As shown in FIG. 5, embodiments of the present disclosure include an edge computing method, the method is applied to an edge device, a daemon is installed on the edge device, the daemon is used to send connection information to a control server when monitoring that an accelerator is connected to the edge device on which the daemon is installed, and the method comprises: step 501: by means of the daemon, the edge device monitors whether an accelerator is connected to the edge device; step 502: the edge device sends connection information to the control server by means of the daemon when monitoring that an accelerator is connected to the edge device, wherein the connection information is used to indicate that the edge device on which the daemon sending the connection information is installed is connected to an accelerator; and step 503: the edge device controls an accelerator connected to the edge device to execute a target application when the target application has been loaded onto the edge device under the control of the control server, wherein the target application is an application which a target edge device requests an accelerator to execute, and the target edge device is any other edge device connected to the control server.

In some embodiments, an edge device may install a daemon under the control of the control server, and the daemon monitors the edge device. Once monitoring that an accelerator is connected to the edge device, the daemon sends connection information to the control server. After an accelerator is connected to the edge device, the control server may use the edge device as a second edge device and load a target application onto the edge device, and the edge device may execute the target application by the connected accelerator. When installing the target application on the edge device, the control server notifies the edge device that it is necessary for the accelerator to execute the target application so that the edge device controls the accelerator to execute the target application. In this way, the edge device may share the connected accelerator with any other edge device.

On the basis of steps 501 and 502 of the edge computing method shown in FIG. 5 and steps 201 and 202 of the edge computing method shown in FIG. 2, the edge device interacts with the control server by a daemon, and when an accelerator is connected to the edge device, the control server configures an accelerator enabled flag for the edge device in time to indicate that an accelerator is connected to the edge device.

On the basis of step 503 of the edge computing method shown in FIG. 5 and steps 204 and 205 of the edge computing method shown in FIG. 1, the control server selects the edge device as the second edge device in the edge computing method shown in FIG. 2 and installs the target application on the edge device so that the target application can utilize the computing resources of the accelerator to run. Equivalently, the target edge device can also use the accelerator, and thus the sharing of the accelerator is realized. The target edge device may be used as the first edge device in the edge computing method show in FIG. 2.

Figure 6:
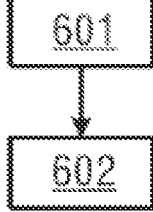
FIG. 6 is a flowchart of a further example method of monitoring whether an accelerator connected to an edge device is removed incorporating teachings of the present disclosure.

In some embodiments, on the basis of the edge computing method shown in FIG. 5, in order to allow the control server to obtain in time the information that an accelerator connected to the edge device is removed, the edge device may monitor, by means of a daemon, whether the accelerator on the edge device is removed. Specifically, as shown in FIG. 6, an example edge computing method further comprises:

step 601: by means of the daemon, the edge device monitors whether an accelerator connected to the edge device is removed; and step 602: the edge device sends disconnection information to the control server by means of the daemon when monitoring that an accelerator connected to the edge device is removed so that the control server deletes the accelerator enabled flag of the edge device on which the daemon sending the disconnection information is installed according to the disconnection information, wherein the disconnection information is used to indicate that an accelerator connected to the edge device on which the daemon sending the disconnection information is installed is removed, and the accelerator enabled flag is used to indicate that the edge device marked with the accelerator enabled flag is connected to an accelerator.

In some embodiments, a daemon sends disconnection information to the control server when monitoring that an accelerator connected to the edge device is removed so that the control server maintains the accelerator enabled flag of the edge device according to disconnection information. On the basis of the method of monitoring whether an accelerator connected to an edge device is removed in FIG. 6 and the method of monitoring whether an accelerator connected to an edge device is removed in FIG. 3, the edge device interacts with the control server, and the control server obtains in time the information that the accelerator is removed, and deletes the corresponding accelerator enabled flag of the edge device. No accelerator enabled flag indicates that no accelerator is connected to the edge device.

In some embodiments, on the basis of the edge computing method shown in FIG. 2 or the method of monitoring whether an accelerator connected to an edge device is removed in FIG. 3, data which a target application needs to process may be sent to an edge device in either of the following two ways:

a first mode: before the edge device controls an accelerator connected to the edge device to execute the target application, it further comprises the edge device receiving data that is sent by the control server and comes from the target edge device, and the edge device controlling an accelerator connected to the edge device to execute the target application comprises: the edge device controlling an accelerator connected to the edge device to process, by the target application, data coming from the target edge device; and a second mode: before the edge device controls an accelerator connected to the edge device to execute the target application, it further comprises: the edge device receives data sent by the target edge device, and the edge device controlling an accelerator connected to the edge device to execute the target application comprises the edge device controlling an accelerator connected to the edge device to process, by the target application, data coming from the target edge device.

In the first mode, the edge device directly interacts with the control server and the control server sends data to the edge device. In the second mode, the edge device needs to establish a connection with the target edge device, and the target edge device directly sends data to the edge device. In the edge device, computing resources of the connected accelerator are utilized to execute the target application so that the target application processes received data.

Figure 7:
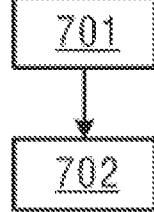
FIG. 7 is a flowchart of a further example method of acquiring the driver of an accelerator incorporating teachings of the present disclosure.

In some embodiments, on the basis of the edge computing method in FIG. 2 or the method of monitoring whether an accelerator connected to an edge device is removed in FIG. 3, when an edge device is connected to an accelerator, it is necessary to install a driver for the accelerator. As shown in FIG. 7, the driver of the accelerator may be specifically acquired in the following way the method further comprises: step 701: the edge device sends a driving request to the control server by means of the daemon when monitoring that an accelerator is connected to the edge device, wherein the driving request is used to request the driver of the accelerator connected to the edge device on which the daemon sending the driving request is installed; and step 702: the edge device receives the driver sent by the control server and installs the driver.

In some embodiments, the edge device sends a driving request to the control server by means of the daemon, the driving request may include information (for example, equipment no. of an accelerator, type of an accelerator and driver required for an accelerator) of an accelerator, and the control server acquires the driver based on the driving request.

On the basis of the method of acquiring the driver of an accelerator in FIG. 7 and the method of acquiring the driver of an accelerator in FIG. 4, the edge device interacts with the control server and acquires the driver of an accelerator from the control server. The specific execution sequence is as follows: step 701→step 401→step 402→step 403→step 702.

In some embodiments, an edge computing method is applied to an edge device, and the method comprises: the edge device generating a sharing request, wherein the sharing request is used to request an accelerator to execute a target application; and the edge device sending the sharing request to a control server so that the control server selects an accelerating edge device to which an accelerator is connected and loads the target application onto the accelerating edge device.

In some embodiments, when an edge device needs to use computing resources of an accelerator, the edge device sends a sharing request to a control server. The edge device may serve as the first edge device in the edge computing method in FIG. 2, and the accelerating edge device may be the second edge device in the edge computing method in FIG. 2. On the basis of the step of the edge device sending the sharing request to the control server in the present embodiment, step 503 of the edge computing method in FIG. 5 and steps 204 and 205 of the edge computing method in FIG. 2, the accelerator on the edge device to which an accelerator is connected in FIG. 5 can be shared with the edge device sending the sharing request in the present embodiment.

In some embodiments, the edge device may send data which needs to be processed by a target application to an accelerating edge device in either of the following two ways:

a first mode: the edge device sends data which needs to be processed by the target application to the control server so that the control server forwards the data to the accelerating edge device; and a second mode: the edge device sends data which needs to be processed by the target application to the accelerating edge device under the control of the control server so that an accelerator connected to the accelerating edge device executes the target application to process data coming from the edge device.

In some embodiments, the method further comprises the edge device sending the target application to the control server so that the control server loads the target application to the accelerating edge device.

In some embodiments, a target application may be an application installed on the edge device.

Figure 8:
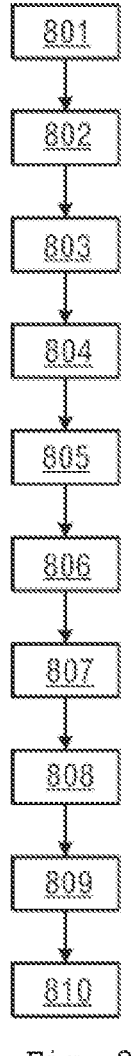
FIG. 8 is a flowchart of still a further example edge computing method incorporating teachings of the present disclosure.

Through the interaction process between the control server and at least two edge devices, an edge computing method is further described in detail below. As shown in FIG. 8, the method may comprise step 801: the control server installs a first container on at least one edge device of at least two edge devices connected to the control server, wherein the first container contains the daemon and the first container is used to run the daemon.

In some embodiments, the daemon and the target application are both packaged in containers, and accordingly, a container orchestration system is configured in the control server. Through the container orchestration system, a container can be installed for each edge device and the container on each edge device can be managed and expanded. The container orchestration system may be a k8s, k3s or KubeEdge, wherein k3s is light-weighted k8s and is more suitable for edge computing. Through the container orchestration system, the control server may install the first container on the edge device by running a simple kubectl command.

In addition, in order to allow the container to run normally on the edge device, Docker is installed on the edge device. Docker is an open-source application container engine, and through Docker, different containers can run on the edge device.

Different applications may run on different edge devices of the at least two edge devices and all these applications may be installed in containers.

Step 802: Each edge device on which a daemon is installed performs the following operations: By means of the daemon, the edge device monitors whether an accelerator is connected to the edge device; the edge device sends connection information and a driving request to the control server by means of the daemon when monitoring that an accelerator is connected to the edge device; the edge device installs a driver when receiving the driver sent by the control server; by means of the daemon, the edge device monitors whether an accelerator connected to the edge device is removed; the edge device sends disconnection information to the control server by means of the daemon when monitoring that an accelerator connected to the edge device is removed; and connection information is used to indicate that the edge device on which the daemon sending the connection information is installed is connected to an accelerator, wherein disconnection information is used to indicate that an accelerator connected to the edge device on which the daemon sending the disconnection information is installed is removed, and the driving request is used to request the driver of the accelerator connected to the edge device on which the daemon sending the driving request is installed.

In some embodiments, interfaces such as USB interfaces and serial ports may be provided on an edge device, and an accelerator may be connected to the edge device through an interface such as USB interface or serial port. The daemon periodically scans the interfaces on the edge device. When an interface is connected to an external device, the daemon identifies the external device. When identifying the external device as an accelerator, the daemon sends connection information and a driving request to the control server.

The daemon may identify the external device in the following way: serial nos. of a plurality of accelerators are pre-stored in the edge device; the daemon acquires the serial no. of the external device from the external device; and the daemon compares the serial no. of the external device with pre-stored serial nos., and determines the external device to be an accelerator when one serial no. of the pre-stored serial nos. is the same as the serial no. of the external device.

After determining that one interface on the edge device is connected to an accelerator, the daemon periodically monitors the interface. When monitoring that the accelerator connected to the interface is disconnected, the daemon determines that the accelerator is removed and sends disconnection information to the control server.

Step 803: The control server receives connection information from any daemon and configures an accelerator enabled flag for the edge device on which the daemon is installed according to the connection information; the control server receives a driving request from any daemon, acquires the driver requested by the driving request, and sends the acquired driver to the edge device sending the driving request; and the control server receives disconnection information from any daemon and deletes the accelerator enabled flag of the edge device on which the daemon sending the disconnection information is installed according to the disconnection information; wherein the accelerator enabled flag is used to indicate that the edge device marked with the accelerator enabled flag is connected to an accelerator.

In some embodiments, when receiving connection information, the control server may configure an accelerator enabled flag for the edge device sending the connection information by running a kubectl command (for example, "kubectl label nodes<your-node-name>acceleratorenabled=yes"). Each edge device on which a daemon is installed interacts with the control server, and after steps 801 to 803, the control server records whether an accelerator is connected to each edge device.

Step 804: The first edge device generates a sharing request and sends the sharing request to the control server, wherein the sharing request is used to request an accelerator to execute a target application.

In some embodiments, any edge device connected to the control server may serve as a first edge device. Each edge device has a certain edge computing capability and usually acquires data to be processed from an acquisition device (for example, sensor) connected to the edge device, and the required application is installed on the edge device to process acquired data. However, computing resources of each edge device are limited and the edge device often fails to meet the requirements of applications on the edge device for computing resources. In this case, the edge device may send a sharing request to the control server to request to share an accelerator. The target application may be an application installed on the first edge device.

Step 805: The control server receives a sharing request from the first edge device and selects an edge device configured with the accelerator enabled flag as a second edge device according to the sharing request.

In some embodiments, a node selector is provided in the container orchestration system. For the container orchestration system, each edge device is a node. Through the node selector, the control server can select an edge device configured with an accelerator enabled flag as a second edge device. Specifically, the node selector of the control server selects a second edge device by running a kubectl command (for example, "nodeSelector: acceleratorenabled: yes").

Step 806: The control server acquires a second container, wherein the second container contains the target application and the second container is used to run the target application. In some embodiments, the target application is packaged in the second container, the second container may run on any edge device, and the second container may be run by any accelerator, without any necessity of developing different applications for different edge devices or different accelerators or configuring a running environment for the target application on edge devices.

Specifically, if the second container is saved in the control server, the second container may come from the control server. If the second container is installed on the first edge device, the second container may come from the first edge device, and the first edge device may simultaneously send the second container while sending a sharing request to the control server.

Step 807: The control server installs the second container on the second edge device. In some embodiments, through the container orchestration system, the control server may install the second container on the second edge device. Wherein, the control server may create the second container on the second edge device. If the second container is installed on the first edge device, the control server may migrate the second container from the first edge device to the second edge device.

Step 808: The first edge device sends data to be processed by the target application to the control server. In addition, the first edge device may also directly send data to be processed by the target application to the second edge device. While sending a sharing request to the control server, the first edge device may also simultaneously send data to be processed by the target application.

Step 809: The control server forwards data coming from the first edge device to the second edge device.

Step 810: The second edge device receives data sent by the control server and coming from the first edge device, and the second edge device controls the accelerator connected to the second edge device to execute the target application in the second container so that the target application processes data coming from the first edge device. In some embodiments, the target application generates a processing result after processing data coming from the first edge device, and the second edge device may send the processing result to the control server or may directly send the processing result to the first edge device or other devices requiring the processing result. After receiving the processing result from the second edge device, the control server may send the processing result to the first edge device or other devices requiring the processing result.

In addition, after the accelerator on the second edge device is removed, the control server may migrate the second container on the second edge device to other edge devices. In some embodiments, a daemon is installed on edge devices, and the daemon cooperates with the control server so that the accelerator connected to any edge device on which the daemon is installed can be shared with any other edge device and then each edge device has enough computing resources to run an edge computing application. Thus, the delay of the edge computing application is reduced greatly and the edge computing application can give a response quickly.

In some embodiments, since the accelerator connected to any edge device on which a daemon is installed can be shared with any other edge device, the accelerator may be connected to any edge device on which the daemon is installed when the edge device requires the accelerator, without any necessity of connecting the accelerator to the edge device requiring the accelerator. Thus, the connection of the accelerator is very flexible and convenient.

In some embodiments, by connecting an accelerator to an edge device and sharing the accelerator between different edge devices, current edge devices can meet the requirements of various applications for computing resources, and can more efficiently utilize computing resources of the accelerator.

Figure 9:
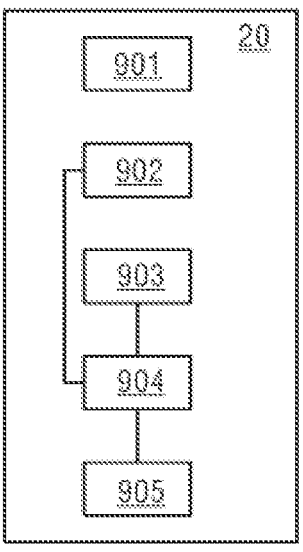
FIG. 9 is a schematic diagram of an example control server incorporating teachings of the present disclosure.

As shown in FIG. 9, an example control server 20 comprises: a first installation module 901, used to install a daemon on at least one edge device 10 of at least two edge devices 10 connected to the control server 20, wherein the daemon is used to send connection information to the control server 20 when monitoring that an accelerator is connected to the edge device 10 on which the daemon is installed, and the connection information is used to indicate that the edge device 10 on which the daemon sending the connection information is installed is connected to an accelerator; a first receiving module 902, used to receive the connection information from any daemon installed by the first installation module 901 and configure an accelerator enabled flag for the edge device 10 on which the daemon is installed according to the connection information, wherein the accelerator enabled flag is used to indicate that the edge device 10 marked with the accelerator enabled flag is connected to an accelerator; a second receiving module 903, used to receive a sharing request from any first edge device 10, wherein the sharing request is used to request an accelerator to execute a target application and the first edge device 10 is one edge device 10 of the at least two edge devices 10; a selection module 904, used to select an edge device configured with the accelerator enabled flag as a second edge device 10 according to the sharing request received by the second receiving module 903; and a second installation module 905, used to load the target application onto the second edge device 10 selected by the selection module 904 so that the accelerator connected to the second edge device 10 executes the target application.

In some embodiments, the first installation module 901 may be used to perform step 201 in the embodiment of the above-mentioned method, the first receiving module 902 may be used to perform step 202 in the embodiment of the above-mentioned method, the second receiving module 903 may be used to perform step 203 in the embodiment of the above-mentioned method, the selection module 904 may be used to perform step 204 in the embodiment of the above-mentioned method, and the second installation module 905 may be used to perform step 205 in the embodiment of the above-mentioned method.

Figure 10:
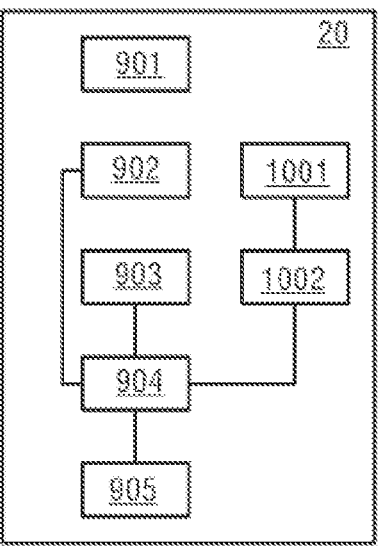
FIG. 10 is a schematic diagram of a further example control server incorporating teachings of the present disclosure.

On the basis of the control server 20 shown in FIG. 9, as shown in FIG. 10, the control server 20 further comprises: a third receiving module 1001, used to receive disconnection information from a daemon installed by the first installation module 901, wherein the daemon is further used to send the disconnection information to the control server when monitoring that an accelerator connected to the edge device 10 on which the daemon is installed is removed, and the disconnection information is used to indicate that an accelerator connected to the edge device 10 on which the daemon sending the disconnection information is installed is removed; and a deletion module 1002, used to delete the accelerator enabled flag of the edge device 10 on which the daemon sending the disconnection information is installed according to the disconnection information received by the third receiving module 1001.

In some embodiments, the third receiving module 1001 may be used to perform step 301 in the embodiment of the above-mentioned method, and the deletion module 1002 may be used to perform step 302 in the embodiment of the above-mentioned method. On the basis of the control server 20 shown in FIG. 9, the first installation module 901 is used to install a first container on at least one edge device of at least two edge devices connected to the control server, wherein the first container contains the daemon and the first container is used to run the daemon.

Figure 11:
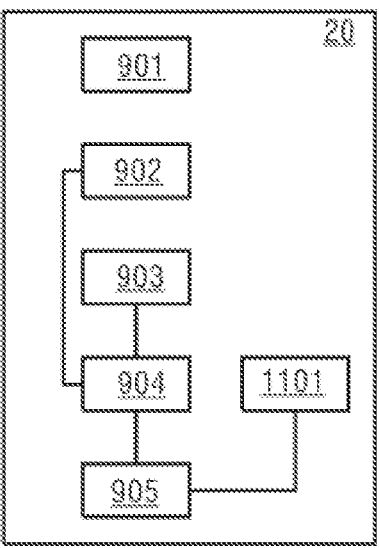
FIG. 11 is a schematic diagram of still a further example control server incorporating teachings of the present disclosure.

On the basis of the control server 20 shown in FIG. 9, the second installation module 905 is used to install a second container on the second edge device, wherein the second container contains the target application and the second container is used to run the target application. On the basis of the control server 20 shown in FIG. 9 or 10, as shown in FIG. 11, the control server 20 further comprises a forwarding module 1101, used to forward data coming from the first edge device 10 to the second edge device 10 after the second installation module 905 loads the target application onto the second edge device 10 so that an accelerator connected to the second edge device 10 executes the target application to process data coming from the first edge device 10.

Figure 12:
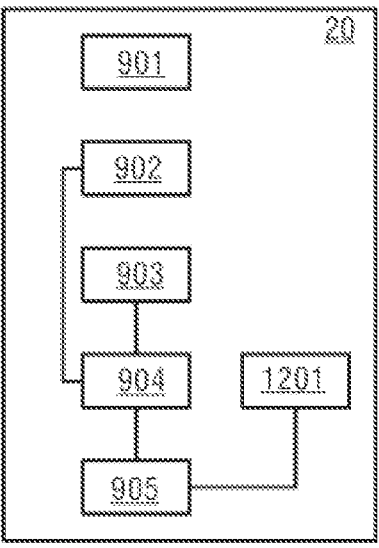
FIG. 12 is a schematic diagram of an example fourth control server incorporating teachings of the present disclosure.

On the basis of the control server 20 shown in FIG. 9 or 10, as shown in FIG. 12, the control server 20 further comprises a control module 1201, used to control the first edge device 10 to send data to the second edge device 10 after the second installation module 905 loads the target application onto the second edge device 10 so that an accelerator connected to the second edge device 10 executes the target application to process data coming from the first edge device 10.

Figure 13:
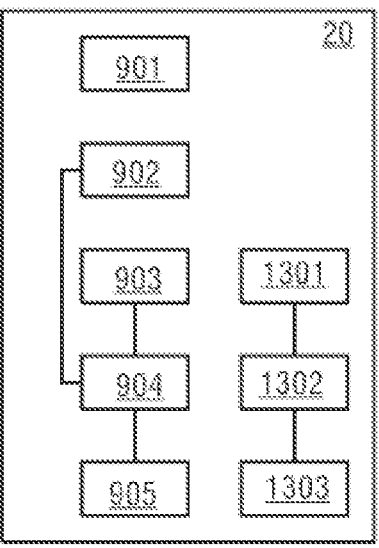
FIG. 13 is a schematic diagram of a fifth example control server incorporating teachings of the present disclosure.

On the basis of the control server 20 shown in FIG. 9 or 10, as shown in FIG. 13, the control server 20 further comprises a fourth receiving module 1301, used to receive a driving request from any daemon installed by the first installation module 901, wherein the driving request is sent by a daemon when the daemon monitors that an accelerator is connected to the edge device 10 on which the daemon is installed, and the driving request is used to request the driver of the accelerator connected to the edge device 10 on which the daemon sending the driving request is installed; a first acquisition module 1302, used to acquire a driver requested by the driving request received by the fourth receiving module 1301; and a first sending module 1303, used to send the driver acquired by the first acquisition module 1302 to an edge device sending the driving request so that the edge device 10 installs the driver.

In some embodiments, the fourth receiving module 1301 may be used to perform step 401 in the embodiment of the above-mentioned method, the first acquisition module 1302 may be used to perform step 402 in the embodiment of the above-mentioned method, and the first sending module 1303 may be used to perform step 403 in the embodiment of the above-mentioned method.

Figure 14:
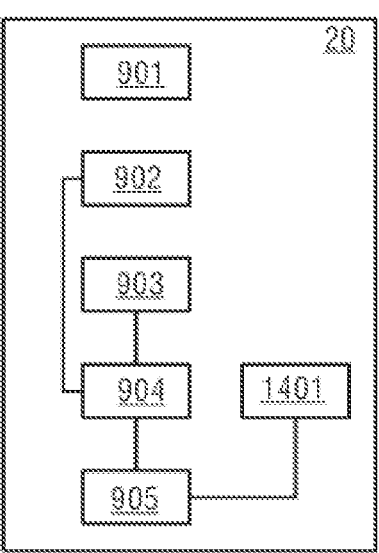
FIG. 14 is a schematic diagram of a sixth example control server incorporating teachings of the present disclosure.

On the basis of the control server 20 shown in FIG. 9 or 10, as shown in FIG. 14, the control server 20 further comprises a fifth receiving module 1401, used to receive the target application from the first edge device 10 before the second installation module 905 loads the target application onto the second edge device 10 so that the second installation module 905 loads the target application onto the second edge device 10.

Figure 15:
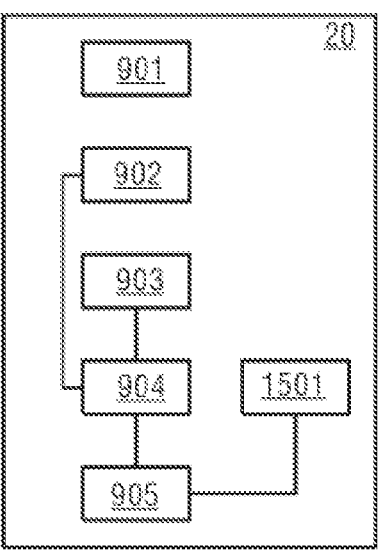
FIG. 15 is a schematic diagram of a seventh example control server incorporating teachings of the present disclosure.

On the basis of the control server 20 shown in FIG. 9 or 10, as shown in FIG. 15, the control server 20 further comprises a second acquisition module 1501, used to acquire the target application from at least one pre-stored application according to the sharing request before the second installation module 905 loads the target application onto the second edge device 10 so that the second installation module 905 loads the target application onto the second edge device 10.

Figure 16:
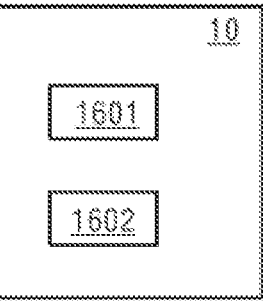
FIG. 16 is a schematic diagram of an example edge device incorporating teachings of the present disclosure.

In some embodiments with an edge device 10, a daemon is installed on the edge device 10, the daemon is used to send connection information to a control server 20 when monitoring that an accelerator is connected to the edge device 10 on which the daemon is installed, and as shown in FIG. 16, the edge device comprises: a first monitoring module 1601, used to monitor, by means of the daemon, whether an accelerator is connected to the edge device and send connection information to the control server 20 by means of the daemon when monitoring that an accelerator is connected to the edge device, wherein the connection information is used to indicate that the edge device 10 on which the daemon sending the connection information is installed is connected to an accelerator; and an accelerator control module 1602, used to control an accelerator connected to the edge device to execute a target application when the target application has been loaded onto the edge device 10 under the control of the control server 20, wherein the target application is an application which a target edge device 10 requests an accelerator to execute, and the target edge device 10 is any other edge device 10 connected to the control server 20.

In some embodiments, the first monitoring module 1601 may be used to perform steps 501 and 502 in the embodiment of the above-mentioned method, and the accelerator control module 1602 may be used to perform step 503 in the embodiment of the above-mentioned method.

Figure 17:
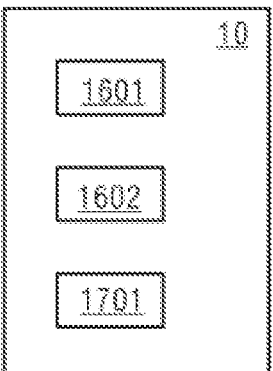
FIG. 17 is a schematic diagram of a further example edge device incorporating teachings of the present disclosure.

On the basis of the edge device shown in FIG. 16, as shown in FIG. 17, the edge device further comprises a second monitoring module 1701, used to monitor, by means of the daemon, whether an accelerator connected to the edge device 10 is removed and send disconnection information to the control server 20 by means of the daemon when monitoring that an accelerator connected to the edge device 10 is removed so that the control server 20 deletes the accelerator enabled flag of the edge device 10 on which the daemon sending the disconnection information is installed according to the disconnection information, wherein the disconnection information is used to indicate that an accelerator connected to the edge device 10 on which the daemon sending the disconnection information is installed is removed, and the accelerator enabled flag is used to indicate that the edge device 10 marked with the accelerator enabled flag is connected to an accelerator.

Figure 18:
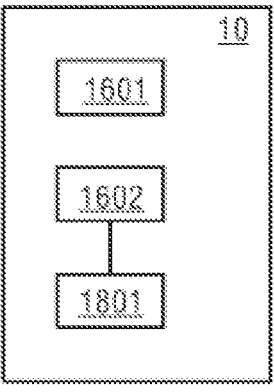
FIG. 18 is a schematic diagram of still a further example edge device incorporating teachings of the present disclosure.

In some embodiments, the second monitoring module 1701 may be used to perform steps 601 and 602 in the embodiment of the above-mentioned method. On the basis of the edge device shown in FIG. 16 or 17, as shown in FIG. 18, the edge device further comprises: a first data receiving module 1801, used to receive data sent by the control server 20 and coming from the target edge device 10 before the accelerator control module 1602 controls an accelerator connected to the edge device 10 to execute the target application; and the accelerator control module 1602, used to control an accelerator connected to the edge device 10 to process, by the target application, data coming from the target edge device 10.

Figure 19:
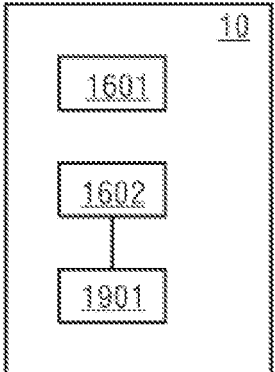
FIG. 19 is a schematic diagram of a fourth example edge device incorporating teachings of the present disclosure.

On the basis of the edge device shown in FIG. 16 or 17, as shown in FIG. 19, the edge device 10 further comprises: a second data receiving module 1901, used to receive data sent by the target edge device 10 before the accelerator control module 1602 controls an accelerator connected to the edge device 10 to execute the target application; and the accelerator control module 1602 is used to control an accelerator connected to the edge device 10 to process, by the target application, data coming from the target edge device 10.

Figure 20:
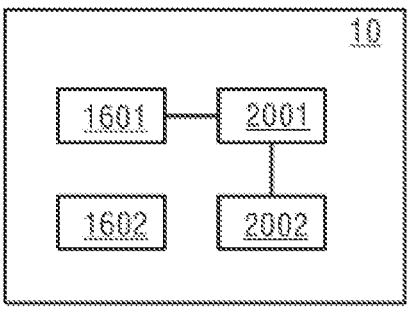
FIG. 20 is a schematic diagram of a fifth example edge device incorporating teachings of the present disclosure.

On the basis of the edge device shown in FIG. 16 or 17, as shown in FIG. 20, the edge device 10 further comprises: a driving request module 2001, used to send a driving request to the control server 20 by means of the daemon when the first monitoring module 1601 monitors that an accelerator is connected to the edge device 10, wherein the driving request is used to request the driver of the accelerator connected to the edge device 10 on which the daemon sending the driving request is installed; and a driving receiving module 2002, used to receive a driver sent by the control server 20 and install the driver.

In some embodiments, the driving request module 2001 may be used to perform step 601 in the embodiment of the above-mentioned method, and the driving receiving module 2002 may be used to perform step 602 in the embodiment of the above-mentioned method.

Figure 21:
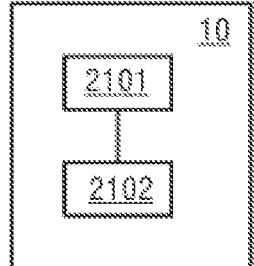
FIG. 21 is a schematic diagram of a sixth example edge device incorporating teachings of the present disclosure.

As shown in FIG. 21, an edge device 10 comprises: a request generation module 2101, used to generate a sharing request, wherein the sharing request is used to request an accelerator to execute a target application; and a request sending module 2102, used to send the sharing request from the request generation module 2101 to a control server 20 so that the control server 20 selects an accelerating edge device to which an accelerator is connected and loads the target application onto the accelerating edge device.

Figure 22:
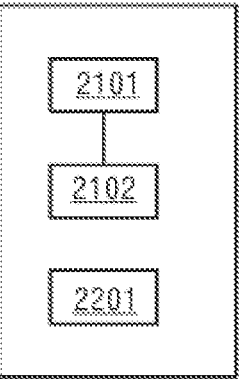
FIG. 22 is a schematic diagram of a seventh example edge device incorporating teachings of the present disclosure.

On the basis of the edge device shown in FIG. 21, as shown in FIG. 22, the edge device 10 further comprises a first data sending module 2201, used to send data which needs to be processed by the target application to the control server 20 so that the control server 20 forwards the data to the accelerating edge device.

Figure 23:
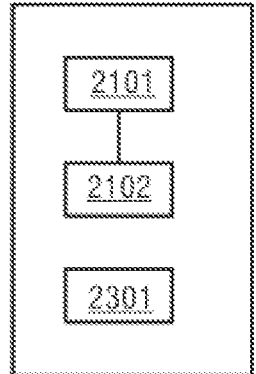
FIG. 23 is a schematic diagram of an eighth example edge device incorporating teachings of the present disclosure.

On the basis of the edge device shown in FIG. 21, as shown in FIG. 23, the edge device 10 further comprises: a second data sending module 2301, used to send data which needs to be processed by the target application to the accelerating edge device under the control of the control server 20 so that an accelerator connected to the accelerating edge device executes the target application to process data coming from the edge device.

Figure 24:
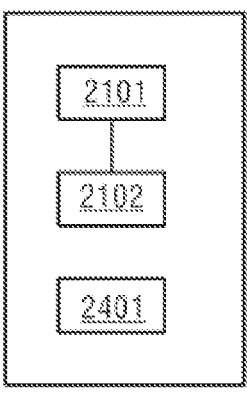
FIG. 24 is a schematic diagram of a ninth example edge device incorporating teachings of the present disclosure.

On the basis of the edge device shown in FIG. 21, as shown in FIG. 24, the edge device 10 further comprises a program sending module 2401, used to send the target application to the control server 20 so that the control server 20 loads the target application onto the accelerating edge device.

Figure 25:
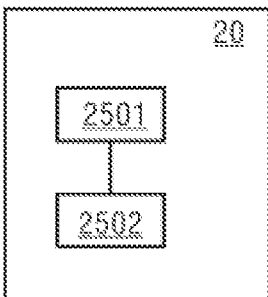
FIG. 25 is a schematic diagram of an eighth example control server incorporating teachings of the present disclosure.

As shown in FIG. 25, a control server provided in embodiments of the present invention comprises at least one first memory 2501 and at least one first processor 2502; the at least one first memory 2501 is configured to store executable instructions, and the at least one first processor 2502 is coupled with the at least one first memory 2501, and when executing the executable instructions, the at least one first processor is configured to: install a daemon on at least one edge device of at least two edge devices connected to the control server, wherein the daemon is used to send connection information to the control server when monitoring that an accelerator is connected to the edge device on which the daemon is installed, and the connection information is used to indicate that the edge device on which the daemon sending the connection information is installed is connected to an accelerator; receive the connection information from any daemon and configure an accelerator enabled flag for the edge device on which the daemon is installed according to the connection information, wherein the accelerator enabled flag is used to indicate that the edge device marked with the accelerator enabled flag is connected to an accelerator; receive a sharing request from any first edge device, wherein the sharing request is used to request an accelerator to execute a target application and the first edge device is one edge device of the at least two edge devices; select an edge device configured with the accelerator enabled flag as a second edge device according to the sharing request; and load the target application onto the second edge device so that the accelerator connected to the second edge device executes the target application.

In some embodiments, on the basis of the control server shown in FIG. 25, when executing the executable instructions, the at least one first processor 2502 is further configured to: receive disconnection information from a daemon, wherein the daemon is further used to send the disconnection information to the control server when monitoring that an accelerator connected to the edge device on which the daemon is installed is removed, and the disconnection information is used to indicate that an accelerator connected to the edge device on which the daemon sending the disconnection information is installed is removed; and delete the accelerator enabled flag of the edge device on which the daemon sending the disconnection information is installed according to the disconnection information.

In some embodiments, on the basis of the control server shown in FIG. 25, when executing the executable instructions, the at least one first processor 2502 is further configured to install a first container on at least one edge device of at least two edge devices connected to the control server, wherein the first container contains the daemon and the first container is used to run the daemon.

In some embodiments, on the basis of the control server shown in FIG. 25, when executing the executable instructions, the at least one first processor 2502 is further configured to: install a second container on the second edge device, wherein the second container contains the target application and the second container is used to run the target application.

In some embodiments, on the basis of the control server shown in FIG. 25, when executing the executable instructions, the at least one first processor 2502 is further configured to: forward data coming from the first edge device to the second edge device so that the accelerator connected to the second edge device executes the target application to process data coming from the first edge device; or, control the first edge device to send data to the second edge device so that the accelerator connected to the second edge device executes the target application to process data coming from the first edge device.

In some embodiments, on the basis of the control server shown in FIG. 25, when executing the executable instructions, the at least one first processor 2502 is further configured to: receive a driving request from any daemon, wherein the driving request is sent by a daemon when the daemon monitors that an accelerator is connected to the edge device on which the daemon is installed, and the driving request is used to request the driver of the accelerator connected to the edge device on which the daemon sending the driving request is installed; acquire the driver requested by the driving request; and send the acquired driver to the edge device sending the driving request so that the edge device installs the driver.

In some embodiments, on the basis of the control server shown in FIG. 25, when executing the executable instructions, the at least one first processor 2502 is further configured to: receive the target application from the first edge device to load the received target application onto the second edge device; or, acquire the target application from at least one pre-stored application according to the sharing request to load the acquired target application onto the second edge device.

Figure 26:
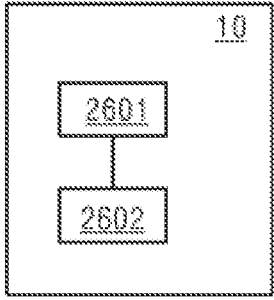
FIG. 26 is a schematic diagram of a tenth example edge device incorporating teachings of the present disclosure.

As shown in FIG. 26, an example edge device comprises at least one second memory 2601 and at least one second processor 2602; the at least one second memory 2601 is configured to store executable instructions, and the at least one second processor 2602 is coupled with the at least one second memory 2601, and when executing the executable instructions, the at least one second processor is configured to: by means of the daemon, monitor whether an accelerator is connected to the edge device; send connection information to the control server by means of the daemon when monitoring that an accelerator is connected to the edge device, wherein the connection information is used to indicate that the edge device on which the daemon sending the connection information is installed is connected to an accelerator; and control an accelerator connected to the edge device to execute a target application when the target application has been loaded onto the edge device under the control of the control server, wherein the target application is an application which a target edge device requests an accelerator to execute, and the target edge device is any other edge device connected to the control server.

In some embodiments, on the basis of the control server shown in FIG. 26, when executing the executable instructions, the at least one second processor 2602 is further configured to: by means of the daemon, monitor whether an accelerator connected to the edge device is removed; and send disconnection information to the control server by means of the daemon when monitoring that an accelerator connected to the edge device is removed so that the control server deletes the accelerator enabled flag of the edge device on which the daemon sending the disconnection information is installed according to the disconnection information, wherein the disconnection information is used to indicate that an accelerator connected to the edge device on which the daemon sending the disconnection information is installed is removed, and the accelerator enabled flag is used to indicate that the edge device marked with the accelerator enabled flag is connected to an accelerator.

In some embodiments, on the basis of the control server shown in FIG. 26, when executing the executable instructions, the at least one second processor 2602 is further configured to: receive data sent by the control server and coming from the target edge device; and control an accelerator connected to the edge device to process, by the target application, data coming from the target edge device; or, receive data sent by the target edge device; and control an accelerator connected to the edge device to process, by the target application, data coming from the target edge device.

In some embodiments, on the basis of the control server shown in FIG. 26, when executing the executable instructions, the at least one second processor 2602 is further configured to: send a driving request to the control server by means of the daemon when monitoring that an accelerator is connected to the edge device, wherein the driving request is used to request the driver of the accelerator connected to the edge device on which the daemon sending the driving request is installed; and receive a driver sent by the control server and install the driver.

In some embodiments, an edge device comprises at least one second memory 2601 and at least one second processor 2602; the at least one second memory 2601 is configured to store executable instructions; the at least one second processor 2602 is coupled with the at least one second memory 2601, and when executing the executable instructions, the at least one second processor is configured to: generate a sharing request, wherein the sharing request is used to request an accelerator to execute a target application; and send the sharing request to a control server so that the control server selects an accelerating edge device to which an accelerator is connected and loads the target application onto the accelerating edge device.

In some embodiments, when further executing the executable instructions, the at least one second processor 2602 is configured to: send data which needs to be processed by the target application to the control server so that the control server forwards the data to the accelerating edge device; or, send data which needs to be processed by the target application to the accelerating edge device under the control of the control server so that an accelerator connected to the accelerating edge device executes the target application to process data coming from the edge device.

In some embodiments, when further executing the executable instructions, the at least one second processor 2602 is configured to allow the edge device to send the target application to the control server so that the control server loads the target application to the accelerating edge device.

Some embodiments include a computer-readable medium, which stores instructions used to allow a machine to execute the edge computing method described in this document. Specifically, a system or device equipped with a storage medium can be provided. Software program codes which can realize the function in any of above-mentioned embodiments are stored in the storage medium and the computer (or CPU or MPU) of the system or device can read and execute the program codes stored in the storage medium. In this case, program codes read from the storage medium themselves can realize the function in any of the above-mentioned embodiments.

Embodiments of the storage medium configured to provide program codes may include a floppy disk, hard disk, magneto-optical disk, compact disk (for example, compact disk read-only memory (CD-ROM), compact disk-recordable (CD-R), compact disk-rewritable (CD-RW), digital video disk-read only memory (DVD-ROM), digital versatile disk-random access memory (DVD-RAM), digital versatile disk plus rewritable (DVD+RW)), magnetic tape, non-volatile memory card, and read-only memory (ROM). In some embodiments, the program codes may be downloaded from a server computer over a communication network.

In addition, it should be understood that the function of any of the above-mentioned embodiments can be realized not only by executing the program codes read out by a computer, but also by allowing the operating system running on the computer to complete a part or all of practical operations through program code based instructions.

In addition, it should be understood that the program codes read out of a storage medium are written into the memory in the expansion board in a computer or are written into a memory in an expansion module connected to the computer, and then the program code based instructions allow the CPU installed on the expansion board or expansion module to execute a part or all of practical operations to realize the function of any of the above-mentioned embodiments.

It should be noted that not all steps or modules in the above-mentioned flowcharts and system structure diagrams are required, and some steps or modules can be omitted, depending on the actual requirements. The execution sequence of the steps is not fixed and may be adjusted as required. The system structures described in the above-mentioned embodiments can be physical structures or logical structures. That is to say, some modules may be realized by a physical entity, or some modules may be realized by a plurality of physical entities or may jointly be realized by some components in a plurality of self-contained devices.

In the above-mentioned embodiments, hardware modules may mechanically or electrically be realized. For example, a hardware module may comprise a permanent dedicated circuit or logic (for example, special processor, FPGA, or ASIC) to complete the corresponding operations. A hardware module may further comprise a programmable logic or circuit (for example, a general processor or other programmable processor) and may complete the corresponding operations through temporary software setting. The specific implementation mode (mechanical mode, or dedicated permanent circuit, or circuit which is temporarily set) may be determined on the basis of the considerations of cost and time.

The teachings of the present disclosure are revealed and described in detail above in combination with the drawings and example embodiments. However, the present disclosure is not limited to the disclosed embodiments. On the basis of the plurality of above-mentioned embodiments, those skilled in the art can know that more embodiments can be obtained by combining the code review means in the above-mentioned different embodiments, and all these embodiments should also fall within the scope of protection of the present disclosure.

The invention claimed is:

1. An edge computing method comprising:
installing a daemon on a first edge device of at least two edge devices connected to a control server, wherein the daemon sends connection information to the control server when an accelerator is connected to the edge device on which the daemon is installed, and the connection information indicates the first edge device is connected to an accelerator;
receiving the connection information from another daemon or the daemon and configuring an accelerator enabled flag for the first edge device based on the connection information, wherein the accelerator enabled flag indicates the first edge device is connected to an accelerator; receiving a sharing request from either edge device, wherein the sharing request requesting an accelerator execute a target application;
labeling an edge device with the accelerator enabled flag as a second edge device according to the sharing request; and loading the target application onto the second edge device so the accelerator connected to the second edge device executes the target application.

2. The method according to claim 1, further comprising:
receiving disconnection information from the daemon when monitoring the accelerator connected to the first edge device is removed; and
deleting the accelerator enabled flag of the first edge device based on the disconnection information.

3. The method according to claim 1, wherein installing a daemon on the first edge device comprises installing a first container on the first edge device, wherein the first container contains the daemon and runs the daemon.

4. The method according to claim 1, wherein loading the target application onto the second edge device comprises installing a second container on the second edge device, wherein the second container contains and runs the target application.

5. The method according to claim 1, wherein, after loading the target application onto the second edge device, the method further comprises:
forwarding data coming from the first edge device to the second edge device so that the accelerator connected to the second edge device executes the target application to process data coming from the first edge device; or controlling the first edge device to send data to the second edge device so the accelerator connected to the second edge device executes the target application to process data coming from the first edge device.

6. The method according to claim 1, further comprising:
receiving a driving request from any other daemon, the another daemon, and the daemon when an accelerator is connected to the respective edge device on which the daemon is installed; acquiring the driver requested by the driving request; and
sending the acquired driver to the particular edge device sending the driving request so that the particular edge device installs the driver.

7. The method according to claim 1, wherein, before loading the target application onto the second edge device, the method further comprises:
receiving the target application from the first edge device to load the received target application onto the second edge device; or
acquiring the target application from at least one pre-stored application according to the sharing request to load the acquired target application onto the second edge device.

8. An edge computing method applied to an edge device with an installed daemon used to send connection information to a control server when an accelerator is connected to the edge device, the method comprising:
monitoring whether an accelerator is connected to the edge device; sending connection information to the control server using the daemon when an accelerator is connected to the edge device, wherein the connection information indicates the edge device is installed is connected to an accelerator; and
controlling the accelerator connected to the edge device to execute a target application when the target application has been loaded onto the edge device under the control of the control server, wherein the target application is an application which a target edge device requests an accelerator to execute, and the target edge device is any other edge device connected to the control server.

9. The method according to claim 8, further comprising:
monitoring whether an accelerator connected to the edge device is removed; and
sending disconnection information to the control server using the daemon when an accelerator connected to the edge device is removed so the control server deletes an accelerator enabled flag of the edge device on which the daemon sending the disconnection information is installed according to the disconnection information indicating the accelerator is removed, and the accelerator enabled flag is used to indicate that the edge device is connected to an accelerator.

10. The method according to claim 8, wherein, before the edge device controls an accelerator connected to the edge device to execute the target application, the method further comprises:
receiving data sent by the control server from the target edge device; and controlling an accelerator connected to the edge device to execute the target application comprises: controlling the accelerator to process, by the target application, data coming from the target edge device, or, before controlling an accelerator connected to the edge device to execute the target application, receiving data sent by the target edge device; and
controlling an accelerator connected to the edge device to execute the target application comprises controlling an accelerator connected to the edge device to process, by the target application, data coming from the target edge device.

11. The method according to claim 8, further comprising:

sending a driving request to the control server using the daemon when an accelerator is connected to the edge device, wherein the driving request requests the driver of the accelerator connected to the edge device on which the daemon sending the driving request is installed; and receiving the driver sent by the control server and installing the driver.

12. A control server comprising:

one or more processors programmed to:

install a daemon on a first edge device of at least two edge devices connected to the control server, wherein the daemon sends connection information to the control server when an accelerator is connected to the first edge device, the connection information indicating the edge device on which the daemon sending the connection information is installed is connected to an accelerator;

receive the connection information from the daemon and configure an accelerator enabled flag for the first edge device based on the connection information, wherein the accelerator enabled flag is used to indicate that the first edge device is connected to an accelerator;

receive a sharing request from a second edge device, wherein the sharing request requests the accelerator to execute a target application;

select the first edge device with the accelerator enabled flag based on the sharing request received; and load the target application onto the first edge device so the accelerator executes the target application.

13. The control server according to claim 12, wherein the one or more processors are further programmed to:

receive disconnection information from the daemon when an accelerator connected to the first edge device is removed, the disconnection information indicating that the accelerator is removed; and delete the accelerator enabled flag of the first edge device based on the disconnection information received.

14. The control server according to claim 12, wherein the one or more processors are further programmed to install a first container on the first edge device, wherein the first container contains and runs the daemon.

15. The control server according to claim 12, wherein one or more processors are further programmed to install a second container on the second edge device, wherein the second container contains and runs the target application.

16. The control server according to claim 12, wherein the one or more processors are further programmed to:

forward data coming from the first edge device to the second edge device loading the target application onto the second edge device so the accelerator executes the target application to process data coming from the first edge device; or control the first edge device to send data to the second edge device after loading the target application onto the second edge device so the accelerator executes the target application to process data coming from the first edge device.

17. The control server according to claim 12, wherein the one or more processors are further programmed to:

receive a driving request from the daemon, when an accelerator is connected to the first edge device, wherein the driving request requests a driver of the accelerator;

acquire the driver; and send the driver to a second edge device so that the second edge device installs the driver.

18. The control server according to claim 12, wherein the one or more processors are further programmed to:

receive the target application from the first edge device before loading the target application onto the second edge device; or acquire the target application from at least one pre-stored application according to the sharing request before loading the target application onto the second edge device.

19. A control server comprising:

a first memory; and a first processor; wherein the first memory stores a machine-readable program;

the first processor is used to invoke the machine-readable program to installing a daemon on a first edge device of at least two edge devices connected to a control server, wherein the daemon sends connection information to the control server when an accelerator is connected to the edge device on which the daemon is installed, and the connection information indicates the first edge device is connected to an accelerator;

receiving the connection information from any daemon and configuring an accelerator enabled flag for the first edge device based on the connection information, wherein the accelerator enabled flag indicates the first edge device is connected to an accelerator;

receiving a sharing request from either edge device, wherein the sharing request requesting an accelerator execute a target application; labeling an edge device with the accelerator enabled flag as a second edge device according to the sharing request; and loading the target application onto the second edge device so the accelerator connected to the second edge device executes the target application.

* * * * *